(12) United States Patent
Evans et al.

(10) Patent No.: US 7,847,497 B2
(45) Date of Patent: Dec. 7, 2010

(54) TRANSITION WIRING SYSTEM FOR MULTIPLE TRACTION GENERATORS

(75) Inventors: Raymond Geraint Evans, Lafayette, IN (US); Walter Earle Earleson, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 276 days.

(21) Appl. No.: 12/007,772

(22) Filed: Jan. 15, 2008

(65) Prior Publication Data

US 2009/0179601 A1    Jul. 16, 2009

(51) Int. Cl.
*H02P 5/00* (2006.01)
(52) U.S. Cl. .................................. 318/139; 318/148
(58) Field of Classification Search ............... 318/139, 318/140, 148, 149
See application file for complete search history.

(56) References Cited

U.S. PATENT DOCUMENTS

| | | | | |
|---|---|---|---|---|
| 2,113,207 A | * | 4/1938 | Yingling | 290/3 |
| 3,547,044 A | * | 12/1970 | Lemaire | 105/1.4 |
| 4,233,858 A | * | 11/1980 | Rowlett | 475/5 |
| 4,328,427 A | * | 5/1982 | Bond | 290/3 |
| 5,632,352 A | * | 5/1997 | Jeanneret et al. | 180/65.23 |
| 6,060,859 A | | 5/2000 | Jonokuchi | |
| 6,268,707 B1 | | 7/2001 | Decottignies | |
| 6,297,978 B1 | | 10/2001 | Cronmiller et al. | |
| 6,408,766 B1 | * | 6/2002 | McLaughlin et al. | 105/231 |
| 6,812,656 B2 | | 11/2004 | Donnelly et al. | |
| 6,984,946 B2 | | 1/2006 | Donnelly et al. | |
| 7,023,171 B2 | | 4/2006 | Su et al. | |
| 2005/0183623 A1 | | 8/2005 | Gritsch | |
| 2005/0280400 A1 | | 12/2005 | Ooiwa | |
| 2006/0012320 A1 | | 1/2006 | Kumar | |
| 2006/0061310 A1 | | 3/2006 | Takai et al. | |
| 2006/0266256 A1 | | 11/2006 | Donnelly et al. | |

* cited by examiner

*Primary Examiner*—Rina I Duda
(74) *Attorney, Agent, or Firm*—Finnegan, Henderson, Farabow, Garrett & Dunner LLC

(57) ABSTRACT

A transition wiring system is provided. The transition wiring system may include one or more traction motors, a first generator, and a second generator. The transition wiring system may also include a first device, a second device, and a third device, each device configured to block reverse current flow. The transition wiring system may further include a single transition contactor disposed between the first generator and the second generator. The first generator and the second generator are configured to be selectively operable in-series and in-parallel.

21 Claims, 3 Drawing Sheets

TRANSITION WIRING SYSTEM FOR MULTIPLE TRACTION GENERATORS

TECHNICAL FIELD

The present disclosure relates to power systems and, more particularly, to power systems having multiple traction generators.

BACKGROUND

Power systems can have one or more generators or engines for supplying electricity to electric power loads. For example, a single generator or engine may drive multiple traction motors, where the motors may be switched by switch gear between an in-parallel configuration and an in-series configuration. Alternatively, a transition wiring system may connect multiple engines or generators to traction motors. The use of a transition wiring system allows each generator to be sized to provide half of the maximum voltage and half of the maximum current needed, providing a significant savings on engine or generator costs, and reducing emissions. The transition function can be accomplished by the wiring between the engines or traction generators and the traction motors. Typically two contactors are used to switch the generators between in-series and in-parallel configurations. At low ground speeds the two contactors are de-energized and the traction energy is low-voltage, high-current. When the locomotive reaches the transition speed, the contactors are energized, and the traction energy is high-voltage, low-current.

U.S. Pat. No. 6,984,946 to Donnelly et al. ("the '946 patent") discloses a locomotive with a plurality of battery racks arranged in-parallel, with the additional capability of providing some or all of the electrically switched battery racks in-series with other battery racks. The capability to switch to an in-series arrangement of battery racks disclosed in the '946 patent includes using solenoids or relay-operated contact switches, which can be operated manually or by logic control. Switching from in-parallel configuration to in-series configuration in the '946 patent allows 50% more voltage to be supplied, but has 50% less ampere-hour capacity than the battery racks configured in-parallel.

The design of the locomotive in the '946 patent may have certain disadvantages. For example, either the contactors must be large enough to break the current running through the contacts to switch between in-series and in-parallel configurations, or the excitation current of the battery racks must be driven to zero before opening the contactors. Contactor size is generally chosen to allow the contactor to carry the current, not break a high traction current. Also, reducing the draw on the battery racks during transition slows down the transition process and may create a surge through the draught gear and couplings.

U.S. Pat. No. 4,328,427 to Bond ("the '427 patent") discloses a locomotive with an AC power supply with two sets of duplicate windings with switching means to change the alternator windings from parallel to series (or vice versa). The capability to switch between in-series and in-parallel disclosed in the '427 patent includes using two switching means, such as contactors. Switching from in-parallel configuration to in-series configuration in the '427 patent allows approximately 50% more voltage to be supplied, but has approximately 50% less ampere-hour capacity than the windings configured in-parallel.

The design of the locomotive in the '427 patent may have certain disadvantages. For example, either the contactors must be large enough to break the current running through the contacts to switch between in-series and in-parallel configurations, or the excitation current of the battery racks must be driven to zero before opening the contactors. Contactor size is generally chosen to allow the contactor to carry the current, not break a high traction current. Also, the AC power supply must be large enough to supply the maximum current draw of the traction motors when the windings are configured in-series and to supply the maximum voltage draw of the traction motors when the windings are configured in-parallel.

The transition wiring system and methods of the present disclosure solve one or more of the shortcomings set forth above.

SUMMARY

One disclosed embodiment relates to a transition wiring system. The transition wiring system may include one or more traction motors, a first generator, and a second generator. Additionally, the transition wiring system may include a first device, a second device, and a third device, each device configured to block reverse current flow. The transition wiring system may also include a single transition contact disposed between the first generator and the second generator, where the first generator and the second generator are configured to be selectively operable in-series and in-parallel.

Another embodiment relates to a method of selectively connecting two generators between an in-series and an in-parallel configuration with one or more traction motors. The method may include connecting a first generator to a traction motor via a transition wiring system and connecting a second generator to the traction motor via the transition wiring system. Additionally, the method may include connecting a first device, a second device, and a third device, each device configured to block reverse current flow in the transition wiring system. The method may also include closing a transition contactor between the first generator and the second generator to connect the first generator and the second generator in-series and opening the transition contactor between the first generator and the second generator to connect the first generator and the second generator in-parallel.

DETAILED DESCRIPTION

Figure 1:
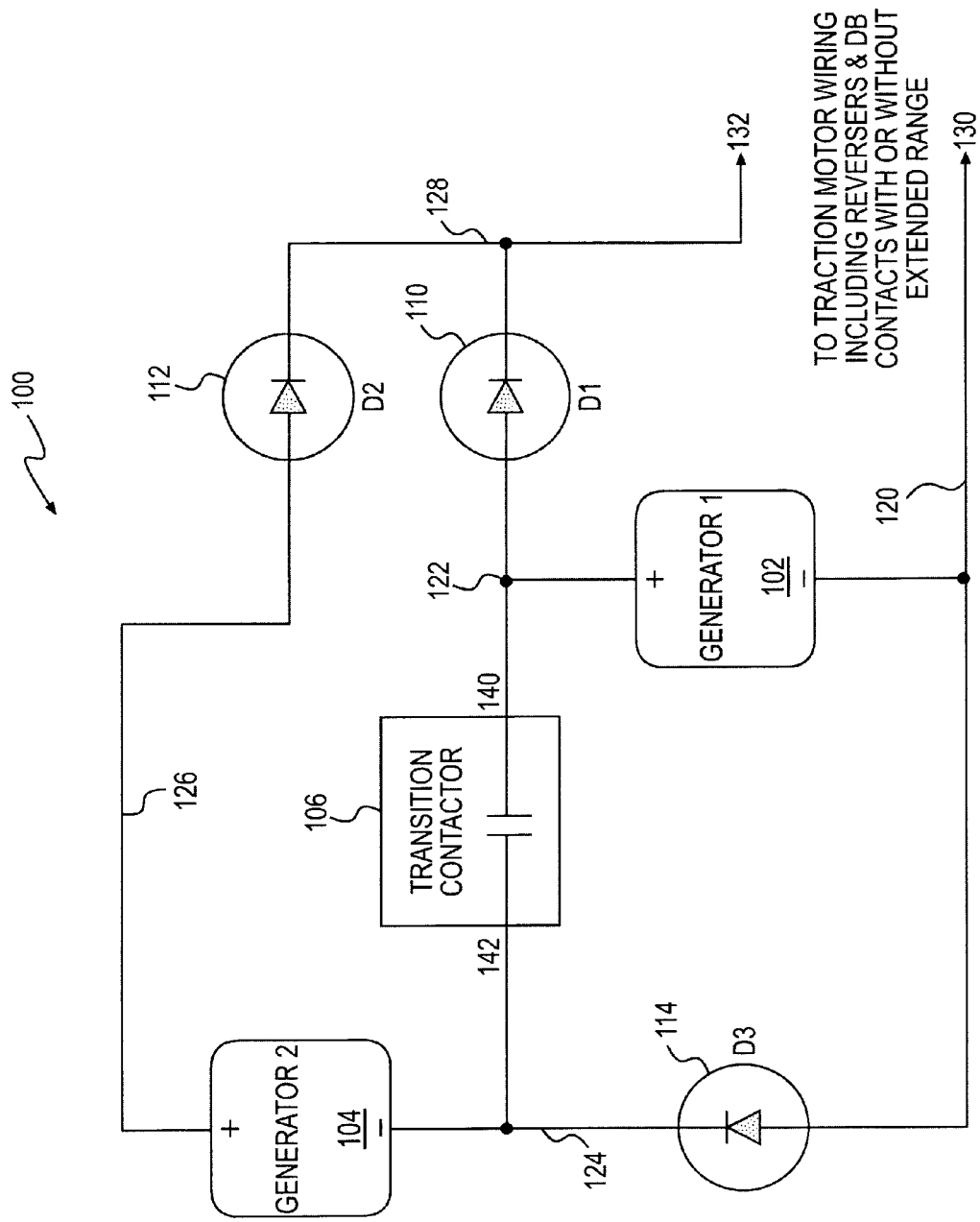
FIG. 1 is a diagrammatic illustration of one exemplary embodiment of a transition wiring system according to the present disclosure.

FIG. 1 illustrates an exemplary transition wiring system 100 according to the present disclosure. Transition wiring system 100 may be used on any mobile machine with one or more traction motors, such as a locomotive, an off-highway construction or farm machine, an on-highway vehicle, or other machines known in the art. Mobile machines may include a chassis, a motive system, and a power system. Power system may include a transition wiring system 100. Transition wiring system 100 may include a first generator 102, a second generator 104, a transition contactor 106, and devices 110, 112, 114. Connections 120, 122, 124, 126, and 128 may connect various elements, such as a low side 130 and a high side 132 of the traction motor wiring, the negative terminals and positive terminals of first generator 102 and second generator 104, first terminal 140 and second terminal 142 of transition contactor 106, and the (electrical) current-accepting and current-blocking connections of devices 110, 112, 114. Transition wiring system 100 may allow first generator 102 and second generator 104 to be operable both in-series and in-parallel.

First generator 102 and second generator 104 may include an engine, a generator, a battery or fuel cell, or other source of power configured to drive one or more traction motors. First generator 102 and second generator 104 may have a negative terminal and a positive terminal. The positive and negative terminals of first generator 102 and second generator 104 may be electrically connected to other parts of transition wiring system 100 by connections. First generator 102 and second generator 104 may have the same power output, or may be differently sized. In one exemplary embodiment, first generator 102 and second generator 104 are diesel electric drive engines.

Transition contactor 106 may be a high power contactor. Transition contactor 106 may include one or more solenoid or relay-operated contact switches, or other configurations known in the art. Transition contactor 106 may operate manually or by logic control. Transition contactor 106 may have a first terminal 140 and a second terminal 142. If transition contactor 106 is open, transition contactor 106 may interrupt the electrical connection between first terminal 140 and second terminal 142, substantially preventing the flow of current therebetween. If transition contactor 106 is closed, transition contactor 106 may allow current and power to flow between first terminal 140 and second terminal 142.

Figure 2:
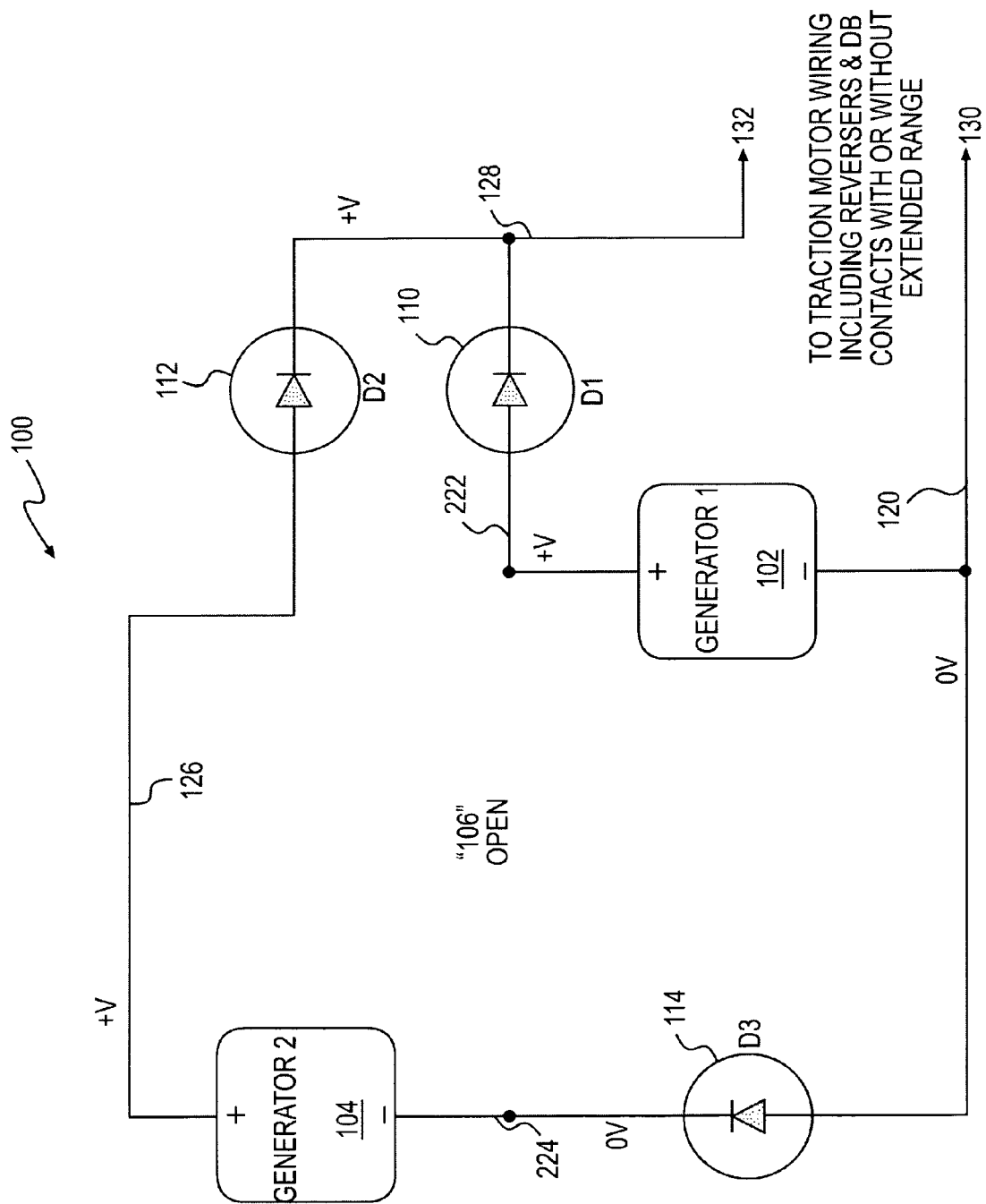
FIG. 2 is a diagrammatic illustration of another exemplary embodiment of a transition wiring system configured in-parallel according to the present disclosure.
Figure 3:
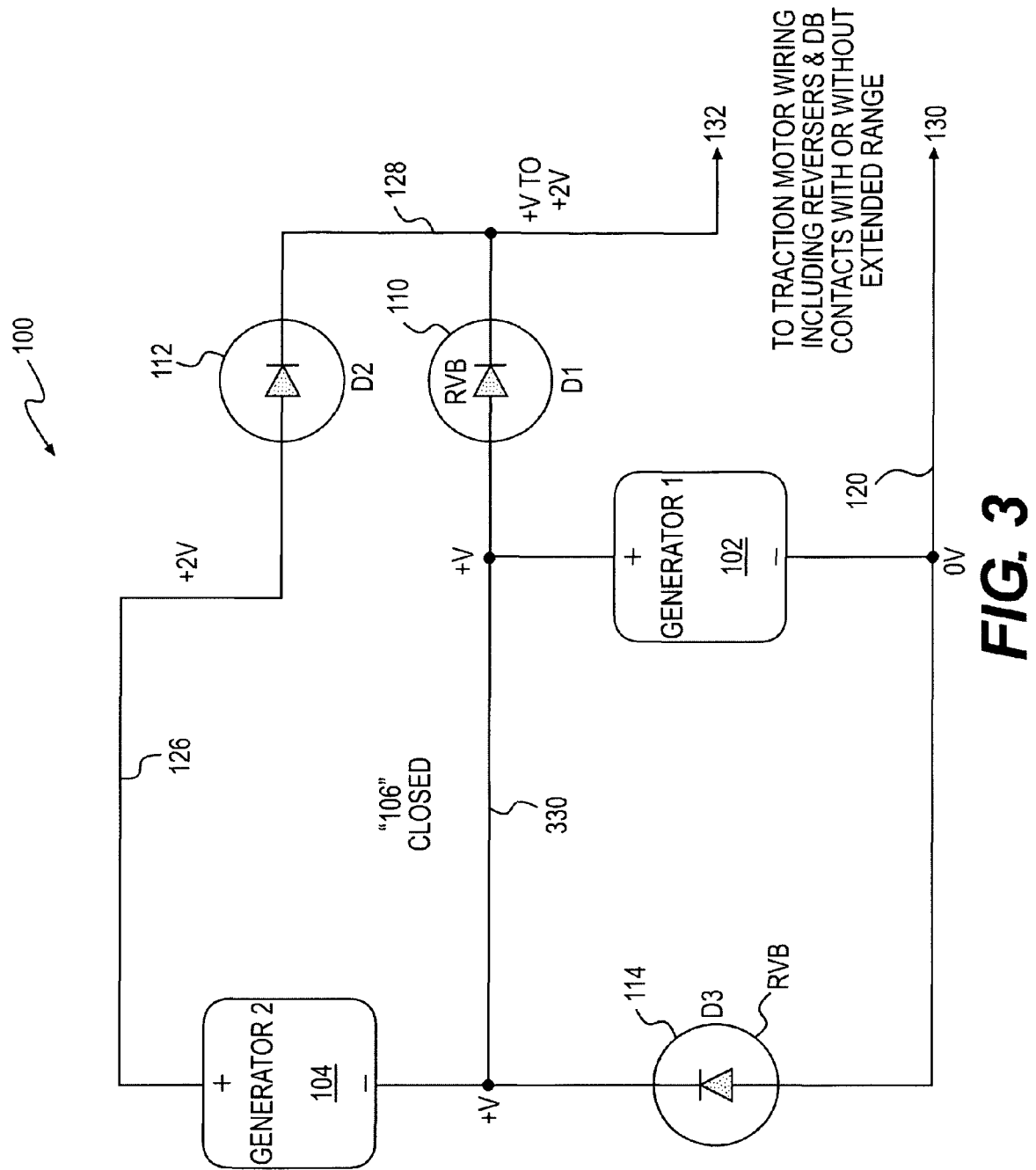
FIG. 3 is a diagrammatic illustration of another exemplary embodiment of a transition wiring system configured in-series according to the present disclosure.

Devices 110, 112, 114 may be any device or assembly of devices that is configured to block reverse current flow. Devices 110, 112, 114 may include current-accepting and current-blocking connections. For example, devices 110, 112, 114 may be diodes (as illustrated in FIGS. 1, 2, and 3). Devices 110, 112, 114 may be forward biased if they allow a flow of current when the voltage at the anode is higher or equal to the voltage at the cathode. Devices 110, 112, 114 may be reverse biased if they substantially block the current flow when the voltage at the cathode is higher then the voltage at the anode. Devices 110, 112, 114 may switch automatically between forward biased and reverse biased dependant on the voltage potential at the anode and cathode. Devices 110, 112, 114 may be configured to selectively allow and block the large current flows and voltage potentials present in transition wiring system 100. Devices 110, 112, 114, such as diodes, are well known in the art and need not be further discussed. Devices 110, 112, 114, transition contactor 106, first generator 102, second generator 104, and the traction motor wiring may be connected with connections 120, 122, 124, 126, and 128.

Connections 120, 122, 124, 126, and 128 may be an appropriate gage wire, electrical bus, or other components known in the art configured to carry voltage potentials and current flows. Connection 120 may connect low side 130 of the traction motor wiring, the negative terminal of a first generator 102 and the current-accepting connection of third device 114. Connection 122 may connect first terminal 140 of transition contactor 106, the positive terminal of first generator 102 and the current-accepting connection of first device 110. Connection 124 may connect second terminal 142 of transition contactor 106, the negative terminal of second generator 104 and the current-blocking connection of third device 114. Connection 126 may connect the positive terminal of second generator 104 and the current-accepting connection of second device 112. Connection 128 may connect high side 132 of the traction motor wiring, the current-blocking connection of first device 110, and the current-blocking connection of second device 112. It is contemplated that first generator 102, second generator 104, transition contactor 106, devices 110, 112, 114, and the traction motor wiring may be interconnected via one of several possible arrangements that may achieve a similar result.

When transition contactor 106 is closed, the negative terminal of first generator 102 may create a zero voltage potential on connection 120. The positive terminal of first generator 102 may create a +V voltage potential on connection 122 and connection 124. Transition contactor 106 may have a current flow across it from the positive terminal of first generator 102 to the negative terminal of second generator 104. The voltage potential on the current-accepting connection of device 114 may be zero voltage and the voltage potential on the current-blocking connection may be +V voltage potential, and device 114 may operate in a reverse biased (RVB) state. The positive terminal of second generator 104 may create a +2V voltage potential on connection 126. The +2V voltage potential on connection 126 may forward bias device 112 and allow connection 128 to be at +2V voltage potential. Device 110 may be reverse biased because the current-accepting connection is connected to connection 122 which may be at +V voltage potential, and the current-blocking connection of device 110 is connected to connection 128 which may be at +2V voltage potential. First generator 102 and second generator 104 may operate in-series in this configuration.

To switch transition wiring system 100 from an in-series configuration to an in-parallel configuration may involve progressively driving second generator 104 to substantially zero excitation and, at the same time, progressively increasing excitation of first generator 102; this is performed in such a manner as to maintain a constant voltage across low side 130 and a high side 132 of the traction motor wiring. Both first generator 102 and second generator 104 may be controlled mechanically, by a logic control, or as part of a control system. When second generator 104 has been driven to substantially zero excitation, the negative terminal of first generator 102 may create a zero voltage potential on connection 120. The positive terminal of first generator 102 may create a +V voltage potential on connections 122, 124 and 128. Connection 126 may be at +V voltage potential. Transition contactor 106 may have no current flow across it. Third device 114 may be reverse biased because connection 120 may be at zero voltage potential and connection 124 may be at +V voltage potential, and devices 110 and 112 may be forward biased because connection 122, 126, and 128 may be at +V voltage potential. All of the traction motor current between low side 130 and a high side 132 of the traction motor wiring may be provided by first generator 102 through device 110 and the current flowing thru device 112 may be close to zero because the excitation of second generator 104 is now zero. Because no current may be flowing across transition contactor 106, transition contactor 106 may be opened without damaging its contacts. Once transition contactor 106 is opened, connection 120 and connection 224 may be at zero voltage potential from the negative terminal of first generator 102. Connection 222 may be at +V voltage potential from the positive terminal of first generator 102, device 110 may be forward biased by connection 222, and connection 128 may be at +V voltage potential. Because second generator 104 may not be energized, connection 126 may be at zero voltage potential. Devices 110 and 114 may be forward biased, and second device 112 may be reverse biased. Once transition contactor 106 is open, second generator 104 may be re-energized.

When second generator 104 is energized, transition wiring system 100 will be configured in-parallel, as shown in FIG. 2.

FIG. 2 shows transition wiring system 100 in an exemplary in-parallel configuration. FIG. 2 may be FIG. 1 with transition contactor 106 in an open configuration. When transition contactor 106 is open, connection 222 may connect the positive terminal of first generator 102 and the current-accepting connection of first device 110. Connection 122 may operate as connection 222 when transition contactor 106 is in an open configuration. When transition contactor 106 is open, connection 224 may connect the negative terminal of second generator 104 and the current-blocking connection of third device 114. Connection 124 may operate as connection 224 when transition contactor 106 is in an open configuration. When transition contactor 106 is open, the negative terminal of first generator 102 may create a zero voltage potential on connection 120. The positive terminal of first generator 102 may create a +V voltage potential on connection 222. Transition contactor 106 may be open and current may be substantially blocked between the positive terminal of first generator 102 and the negative terminal of second generator 104. The negative terminal of second generator 104 may create a zero voltage potential on connection 224. The voltage potential on the current-accepting connection of device 114 may be zero voltage and the voltage potential on the current-blocking connection may be a small negative voltage potential, and device 114 may operate in a forward biased state. The positive terminal of second generator 104 may create a +V voltage potential on connection 126. The +V voltage potential on connections 222 and 126 may forward bias devices 110 and 112 by applying +V voltage potential to the current-accepting connections of devices 110 and 112, and a lower or equal voltage potential on the current-blocking connections of devices 110 and 112. First generator 102 and second generator 104 may operate in-parallel in this configuration.

Referring again to FIG. 1 and the discussion above on in-parallel operations, when transition contactor 106 is open no current may flow between connection 122 and connection 124, connection 120 may be at zero voltage potential and connection 124 may be at a small negative voltage potential, connection 122, connection 126, and connection 128 may be at +V voltage potential. Devices 110, 112, and 114 may be forward biased. Transition wiring system 100 may be in an in-parallel configuration.

Transition wiring system 100 may be reconfigured from an in-parallel configuration to an in-series configuration by closing transition contactor 106. When transition contactor 106 is in an open configuration, no current may flow across its contacts. Transition contactor 106 may be closed without damaging its contacts.

FIG. 3 shows transition wiring system 100 in an exemplary in-series configuration. FIG. 3 may be FIG. 1 with transition contactor 106 in a closed configuration. Connection 330 may connect the positive terminal of first generator 102, the current-accepting connection of first device 110, the negative terminal of second generator 104, and the current-blocking connection of third device 114. When transition contactor 106 is in a closed configuration, the electrical path through transition contactor 106 may allow the flow of current, and connection 330 may operate as if connection 122 and 124 were electrically connected. When transition contactor 106 is closed, first generator 102 may create a +V voltage potential on connection 330 and a zero voltage potential on connection 120. Third device 114 may have a zero voltage potential on its current-accepting connection and a +V voltage potential on its current-blocking connection, and may become reverse biased. The negative terminal of second generator 104 may be at +V voltage potential, and because second generator 104 is excited, the positive terminal of second generator 104 may be at +2V. Second device 112 may remain forward biased, which may make connection 128 have a voltage potential of +2V, which may cause first device 110 to become reverse biased. Transition wiring system 100 may be in an in-series configuration, and transition contactor 106 may have current flowing across its contactors.

It is contemplated that transition wiring system 100 may use a controller, computer, or mechanical switches to open and close transition contactor 106. Similarly, the excitation of second generator 104 may be controlled by a controller, computer, or mechanical switches. Various methods of control and monitoring are well known in the art and will not be further discussed. A controller or computer may monitor the status, voltage level, current flow, and other parameters of interest for one, some, or all components of transition wiring system 100. Monitoring the status of various components, and using the status to control various components is well known in the art and need not be discussed further.

INDUSTRIAL APPLICABILITY

Transition wiring system 100 may be used for any task requiring power to operate traction motors, such as in locomotives or diesel electric drive trucks and machines. Transition wiring system 100 may be helpful not only with generators, but also with other power supplies such as engines, battery racks, turbines, etc. Because transition wiring system 100 only uses one transition contactor, transition wiring system 106 may reduce the cost and complexity of components, including transition contactors 106 and devices 110, 112, and 114. Transition wiring system 100 may allow switching between in-series and in-parallel configurations to be made at the power source, and not at the traction motors, further simplifying the system.

A forward transition (accelerating ground speed) may require reconfiguring first generator 102 and second generator 104 from an in-parallel configuration to an in-series configuration. The reconfiguration may provide higher voltage and lower current to the traction motors. A backwards transition (decelerating ground speed) may require reconfiguring first generator 102 and second generator 104 from an in-series configuration to an in-parallel configuration. The reconfiguration may provide lower voltage and higher current to the traction motors.

In one exemplary embodiment, transition wiring system 100 may be in-parallel and the transition contactor 106 may be open. To change from an in-parallel configuration to an in-series configuration, because there is no current across the contacts of transition contactor 106, transition contactor 106 may be closed, and first generator 102 and second generator 104 may substantially maintain operational excitation. To change from an in-series configuration to an in-parallel configuration, second generator 104 may first be driven to substantially zero excitation. At the same time first generator 102 may have its excitation current ramped up in such a way to cause the total KW energy flow to the traction motors to remain substantially constant. Transition contactor 106 may now be opened (because there is no current across the contacts of transition contactor 106). The excitation current of second generator 104 may be ramped up as the excitation to first generator 102 is ramped down. The ramping up of first generator 102 and ramping down of second generator 104 may be performed in such a way that the total KW energy flow to the traction motors remains substantially constant. This ramping function may stop when first generator 102 and second generator 104 are carrying the same load. Transition wiring network 100 may then be in an in-parallel configuration. In switching between an in-parallel configuration and an in-series configuration, devices 110, 112, and 114 may switch automatically between forward biased and reverse biased depending on the voltage potential at the current-accepting connection and current-blocking connection of devices 110, 112, 114.

First generator 102 may not have to be driven to substantially zero excitation to switch between in-series configuration and in-parallel configuration. Second generator 104 may only need to be driven to substantially zero excitation when transition wiring system 100 is switching from an in-series configuration to an in-parallel configuration. Switching from an in-parallel configuration of transition wiring system 100 to an in-series configuration may be accomplished faster with little transient changes in the KW energy flow to the traction motors if the excitation current to first generator 102 and second generator 104 is kept essentially constant during the transition process, neither first generator 102 or second generator 104 has to be driven to substantially zero excitation. Both first generator 102 and second generator 104 may experience a doubling of their current and a halving of their output voltages.

In addition, because devices 110, 112, 114 are biased and automatically switch between forward biased to reverse biased faster then a transition contactor may switch, devices 110, 112, 114 may decrease the time required to switch transition wiring system 100 between in-parallel and in-series configurations. In addition, devices 110, 112, 114 may be less complex then contactors.

Another advantage of the present disclosure and its embodiments is the first generator 102 and second generator 104 may be sized to supply one-half the maximum current draw of the traction motors when first generator 102 and second generator 104 are configured in-series and to supply one-half the maximum voltage of the traction motors when first generator 102 and second generator 104 are configured in-parallel. The reduction in generator size and capacity may represent a significant cost savings.

A further advantage of the present disclosure and its embodiments is a reduction in the surge through the draught gear and couplings. As explained above, both forwards and backwards transition can be accomplished with very little change in traction power to the traction motors. In both cases the draught gear and couplings may be under tension and little or no slack will develop in the draught gears and couplings during forward or reverse transitions.

It will be apparent to those skilled in the art that various modifications and variations can be made in the transition wiring system without departing from the scope of the disclosure. Other embodiments of the disclosed transition wiring system and methods will be apparent to those skilled in the art from consideration of the specification and practice of the transition wiring system disclosed herein. It is intended that the specification and examples be considered as exemplary only, with a true scope of the disclosure being indicated by the following claims and their equivalents.

What is claimed is:

1. A transition wiring system, comprising:
    one or more traction motors;
    a first generator;
    a second generator;
    a first device, a second device, and a third device, each configured to block reverse current flow;
    a single transition contactor disposed between the first generator and the second generator wherein the first generator and the second generator are configured to be selectively operable in-series and in-parallel to the one or more traction motors; and
    a control system operable to control the excitation of the first generator independently of the excitation of the second generator.

2. The transition wiring system of claim 1, wherein when the first generator and the second generator are in-series, the transition contactor is closed.

3. The transition wiring system of claim 1, wherein when the first generator and the second generator are in-parallel, the transition contactor is open.

4. The transition wiring system of claim 1, wherein during a transition from in-parallel configuration to in-series configuration of the transition wiring system, the control system maintains substantially continuous excitation of the first generator and the second generator.

5. The transition wiring system of claim 1, wherein during a transition from in-series configuration to in-parallel configuration of the transition wiring system, the control system operates such that the first generator and the second generator are excited to maintain the total KW energy flow to the one or more traction motors substantially constant while driving the second generator to substantially zero excitation and back to substantially continuous excitation.

6. The transition wiring system of claim 1, wherein when the first generator and the second generator are in-series, the first device is forward biased, the second device is forward biased, and the third device is forward biased.

7. The transition wiring system of claim 1, wherein when the first generator and the second generator are in-parallel, the first device is reverse biased, the second device is forward biased, and the third device is reverse biased.

8. The transition wiring system of claim 1, wherein the first device is a diode, the second device is a diode, and the third device is a diode.

9. The transition wiring system of claim 1, further including a computer configured to control the transition contactor open or close state and to collect status on the first generator and the second generator, to collect the status of the transition contactor, and to collect the status of the first device, the second device, and the third device.

10. A method of selectively connecting two generators between an in-series and an in-parallel configuration with one or more traction motors, the method comprising:
    connecting a first generator and a second generator in-series to a traction motor via a transition wiring system;
    connecting the first generator and the second generator in-parallel to the traction motor via the transition wiring system;
    using a transition contactor to switch the first generator and the second generator to connect the first generator and the second generator in-parallel and in-series; and
    with the transition contactor closed, controlling a magnitude of electric current flowing in the transition contactor independently of an electric current supplied to the one or more traction motors.

11. The method of claim 10, further including:
    connecting the first generator to a traction motor via the transition wiring system;
    connecting the second generator to the traction motor via the transition wiring system;
    connecting a first device, a second device, and a third device, each device configured to block reverse current flow in the transition wiring system;

closing a transition contactor between the first generator and the second generator to connect the first generator and the second generator in-series; and opening the transition contactor between the first generator and the second generator to connect the first generator and the second generator in-parallel.

12. The method of claim 11, further including maintaining the substantially continuous excitation of the first generator and the second generator during a transition from in-parallel configuration to in-series configuration.

13. The method of claim 11, wherein controlling a magnitude of electric current flowing in the transition contactor independently of an electric current supplied to the one or more traction motors includes operating the first generator and operating the second generator to maintain the total KW energy flow to the one or more traction motors substantially constant while driving the second generator to substantially zero excitation and back to substantially continuous excitation during a transition from in-series configuration to in-parallel configuration.

14. The method of claim 11, further including forward biasing the first device, forward biasing the second device, and forward biasing the third device when operating the first generator and second generator in-series.

15. The method of claim 11, further including reverse biasing the first device, forward biasing the second device, and reverse biasing the third device when operating the first generator and second generator in-parallel.

16. The method of claim 11, wherein the first device is a diode, the second device is a diode, and the third device is a diode.

17. The method of claim 11, further including:
sensing a status of the first generator, the second generator, the transition contactor, and the first, second, third devices; and
using the sensed status to determine whether to open or close the transition contactor.

18. The method of claim 10, wherein controlling the magnitude of electric current flowing in the transition contactor independently of an electric current supplied to the one or more traction motors includes reducing the magnitude of electric current in the contactor while the transition contactor is closed without reducing the magnitude of electric current supplied to the one or more traction motors.

19. A mobile machine having a transition wiring system, comprising:
a chassis;
a motive system; and
a power system, the power system including one or more traction motors and a transition wiring system, the transition wiring system including:
a first generator;
a second generator;
a first diode, a second diode, and a third diode, each diode configured to block reverse current flow;
a transition contactor disposed between the first generator and the second generator;
the first generator and the second generator configured to be operable in-series by closing the transition contactor between the first generator and the second generator wherein the first diode is forward biased, the second diode is forward biased, the third diode is forward biased, and the first and second generators are connected to the one or more traction motors;
the first generator and the second generator configured to be operable in-parallel by opening the transition contactor between the first generator and the second generator wherein the first diode is reverse biased, the second diode is forward biased, the third diode is reverse biased, and the first and second generators are connected to the one or more traction motors; and
a control system operable to control the excitation of the first generator independently of the excitation of the second generator.

20. The mobile machine of claim 19, wherein during a transition from in-parallel configuration to in-series configuration, the control system operates such that the first generator and the second generator both maintain substantially continuous excitation and during a transition from in-series configuration to in-parallel configuration, the control system operates such that the first generator and the second generator are excited to maintain the total KW energy flow to the one or more traction motors substantially constant while driving the second generator to substantially zero excitation and back to substantially continuous excitation.

21. The mobile machine of claim 19, further including a computer configured to control the transition contactor open or close state and to collect status on the first generator and the second generator, to collect the status of the transition contactor, and to collect the status of the first diode, the second diode, and the third diode.

* * * * *